Sept. 28, 1965         D. SCARAMUCCI         3,208,472
                  DUAL FLAPPER CHECK VALVE
Filed July 15, 1963                          4 Sheets-Sheet 1

INVENTOR.
DOMER SCARAMUCCI
BY
*Dunlap, Laney & Hubbard*
ATTORNEYS

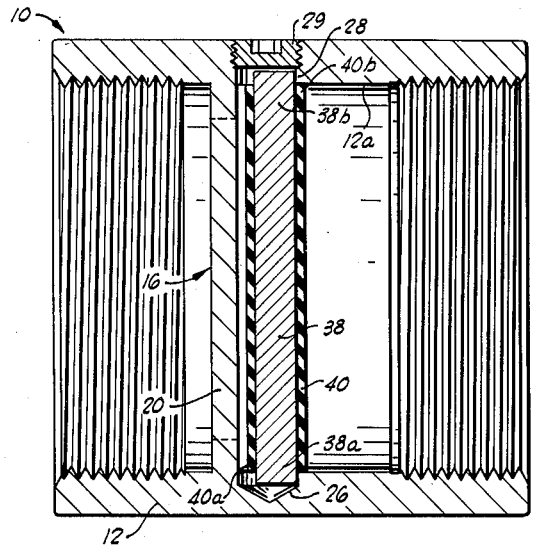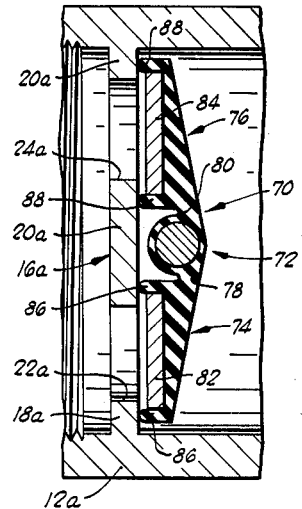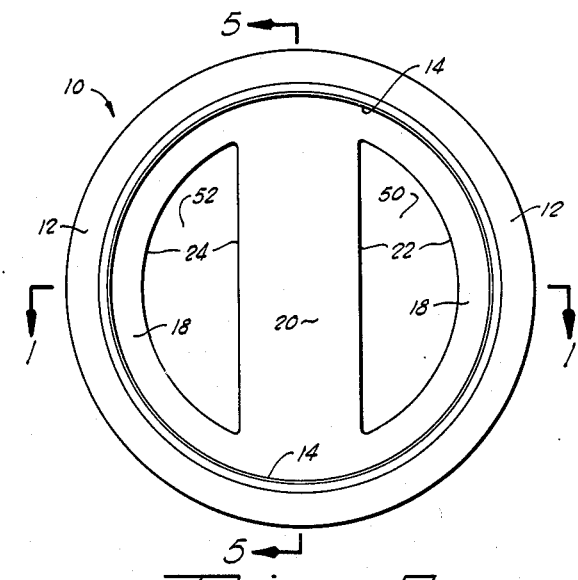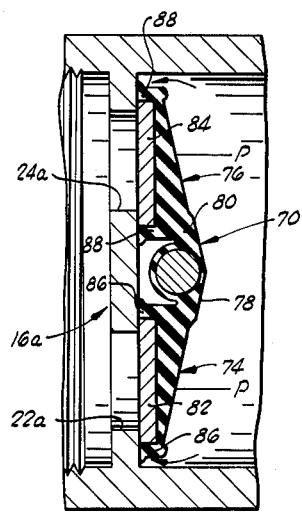

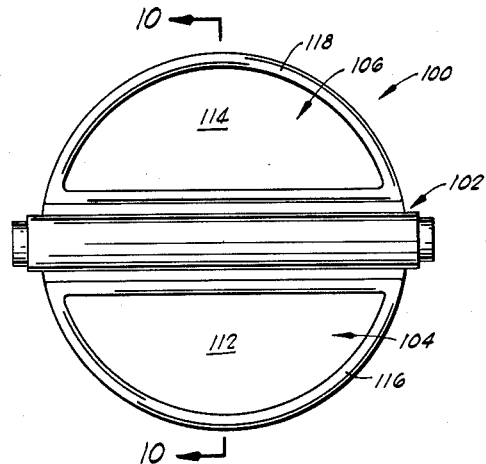
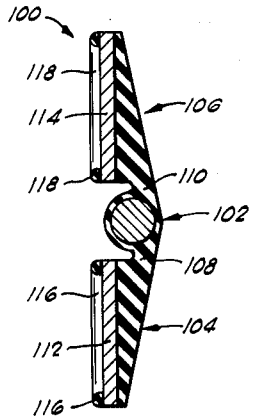
FIG. 9   FIG. 10
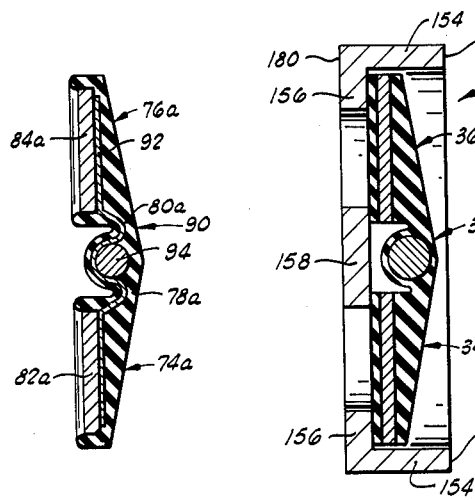
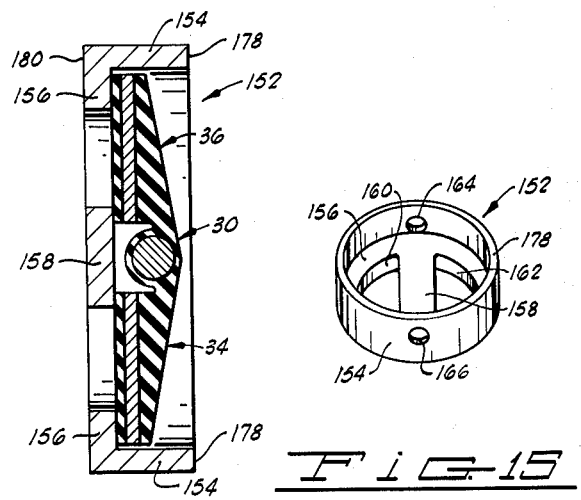
FIG. 11   FIG. 14   FIG. 15

Sept. 28, 1965 D. SCARAMUCCI 3,208,472
DUAL FLAPPER CHECK VALVE
Filed July 15, 1963 4 Sheets-Sheet 4

INVENTOR.
DOMER SCARAMUCCI
BY
Dunlap Laney Hubbard
ATTORNEYS

United States Patent Office 3,208,472
Patented Sept. 28, 1965

3,208,472
DUAL FLAPPER CHECK VALVE
Domer Scaramucci, P.O. Box 9125,
Oklahoma City 15, Okla.
Filed July 15, 1963, Ser. No. 294,843
9 Claims. (Cl. 137—454.2)

The present invention relates to fluid handling, and more particularly, but not by way of limitation, relates to an improved check valve construction for passing fluid in one direction through the valve and blocking flow in the opposite direction.

As is well known in the art, various types of "flapper" valves have been proposed and constructed utilizing resilient valve members which open and close by flexure of a resilient hinge type structure. Some of these valves have utilized resilient material such as rubber, either natural or synthetic, to fabricate the flexible hinge portion and the valve body. Although these valves have been used with varying degrees of success in situations where the valves are not supjected to hard and prolonged usage, these valves have never been successfully employed in heavy duty operations involving high flow volumes and repeated opening and closing of the valve. The primary reason for failure is that the resilient material used for the hinge portion is so formed as to be placed under excessive tensile stress during flexure and the fatigue limit of the material is frequently exceeded. The failure of the hinge portion is also accelerated in nearly all cases due to the fact that when the valve is in the full open position and the resilient material is under maximum tension, the resilient hinge portion is subjected to the abrasive and cutting effects of any foreign particles entrained in the fluid and, as is well known, rubber can be lacerated much easier when under a maximum tension. Further, all flapper-type check valve elements heretofore fabricated from resilient material have been limited to low pressure applications due to the construction of the valve in general and, more particularly, due to the fact that the flapper portions have been wholly fabricated from resilient material.

The present invention contemplates an improved dual flapper-type check valve in which the valve member is fabricated from substantially rigid reinforcing members and a resilient material such as synthetic rubber which forms hinge portions of such a configuration as to never be placed under a tensile stress which will exceed the elastic fatique limits of the material so that the valve will operate under higher pressure and will have a longer service life.

Another object of the present invention is to provide a check valve construction of the type described which utilizes a relatively rigid reinforcing member such as a metallic plate to bridge the valve seat opening such that the valve can be used to check very high pressures.

Still another object of the present invention is to provide a flapper-type valve construction which can be very easily and economically manufactured by molding a resilient material about reinforcing members so as to provide a single integral unit which can be easily installed within a valve housing.

Yet another object of the present invention is to provide a flapper-type valve which is fabricated as a single unit yet which will automatically be maintained in centered relationship within a housing.

A still further object of the present invention is to provide a flapper-type valve member which is molded in such a manner as to provide a constant biasing force tending to close the valve.

Yet another object of the present invention is to provide a check valve construction which can be very economically manufactured and which can be quickly and easily inserted or withdrawn for repair from between two flanges of a fluid conduit.

A still further object of the present invention is to provide a valving device of the type described which can be economically manufactured and very easily assembled within a substantially unitary housing.

Yet another object of the present invention is to provide a valving device of the type described having a reinforcing member imbedded in the resilient material so that the device can be used under high velocity and high pressure flow conditions over a long period of time without failure.

Another object of the present invention is to provide a fluid responsive sealing lip which may be integrally molded with the valve member and which is augmented by fluid pressure acting on the resilient sealing lip.

Yet another object of the present invention is to provide a check valve of the type described which may be easily and economically manufactured on a mass production basis, which will have a long service life and which may be easily and economically repaired.

Many additional objects and advantages of the present invention will be evident to those skilled in the art from the following detailed description and drawings, wherein:

FIG. 5 is a longitudinal sectional view of the valve illustrated in FIG. 1, the sectional view being taken at 90 degrees to the sectional view of FIG. 1 as indicated by the lines 1—1 and 5—5 of FIG. 6;

FIG. 6 is an end view of the valve of FIG. 1 taken from the upstream end;

FIG. 7 is a partial longitudinal sectional view similar to FIG. 1, but utilizing a modified sealing lip on the valve member;

FIG. 8 is a partial sectional view similar to FIG. 7 illustrating the operation of the sealing lip of the valve of FIG. 7 when subjected to a reverse pressure bias;

FIG. 9 is a side view of the upstream face of another valve member constructed in accordance with the present invention;

FIG. 10 is a sectional view taken substantially on lines 10—10 of FIG. 9;

FIG. 11 is a sectional view similar to FIG. 10 showing another valve member constructed in accordance with the present invention;

FIG. 14 is a sectional view of two parts of the valve illustrated in FIG. 12; and, FIG. 15 is a perspective view of one part of the valve illustrated in FIG. 12.

Figure 1:
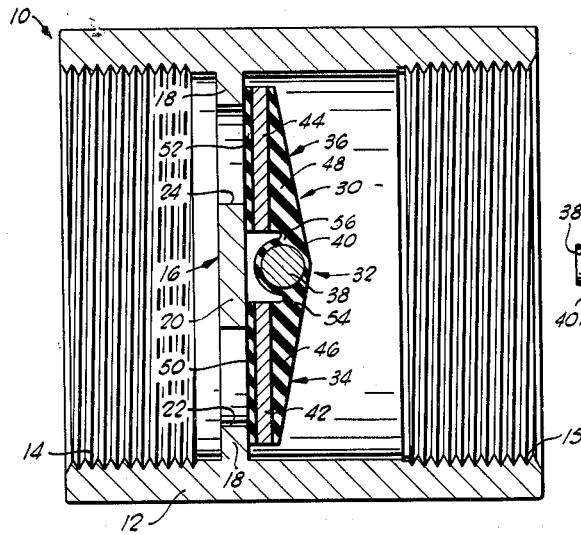
FIG. 1 is a longitudinal sectional view of a valve constructed in accordance with the present invention showing the valve in the closed position.

Referring now to the drawings, and in particular to FIGS. 1-6, a valve constructed in accordance with the present invention is indicated generally by the reference numeral 10. The valve 10 is comprised of a tubular housing 12 having internal threads 14 and 15 at the upstream and downstream ends, respectively, for connecting the valve in a conventional fluid conduit. Of course, any other suitable coupling means may be employed for connecting the valve in the conduit if desired. A seat portion, indicated generally by the reference numeral 16, is formed within the housing 12. The seat portion 16 is comprised generally of an annular portion 18 which extends around the periphery of the housing 12 and a transverse portion 20 which extends transversely across the ring portion 18 to form a pair of seating surfaces 21 and 22 around apertures 23 and 24 respectively which have a shape corresponding to a cordal segment of a circle, as can best be seen in FIG. 6. The housing 12 is also provided with a pair of aligned bores 26 and 28 which are spaced downstream from the seating surfaces 21 and 22 and are aligned with the transverse portion 20 of the seat. The bore 28 is preferably threaded to receive an Allen head plug which forms an adjustable bottom for the bore and also seals the housing after the two bores have been drilled.

A valve member, indicated generally by the reference numeral 30, is comprised of a transversely extending rib portion 32 and flapper portions 34 and 36 which are adapted to cover and close the apertures 22 and 24, respectively. The rib portion 32 preferably has a rigid cylindrical rod 38 which is surrounded by a tubular portion 40 of resilient material. The tubular portion 40 extends beyond the disc-shaped flapper portion and serves as a centering or aligning guide as will hereafter be described in greater detail. The ends of the rod 38 extend beyond the ends of the tubular body 40, as can best be seen in FIG. 3, and into bores 26 and 28 in the housing 12, as can best be seen in FIG. 5, and is aligned with the transverse portion 20 of the seat 16. The rod 38 is inserted in the bores 26 and 28 in a manner which will hereafter be described in greater detail.

Figure 3:
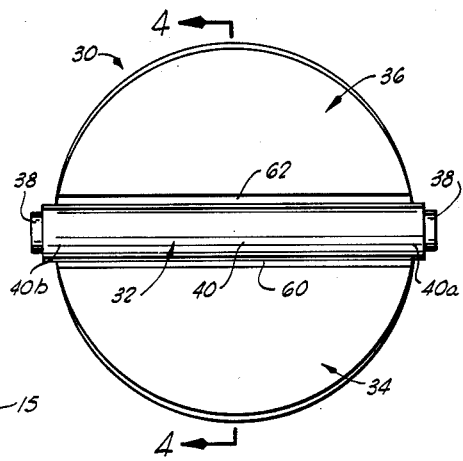
FIG. 3 is a side view of the valve element of the valve of FIG. 1 taken from the upstream side of the valve.

The flapper portions 34 and 36 of the valve member 30 are comprised of substantially rigid reinforcing plates 42 and 44, respectively, which may conveniently be metal and are coextensive with the flapper portions 34 and 36 as illustrated in FIG. 3, and portions 46 and 48 of resilient material bonded to the backside of the plates 42 and 44 and portions 50 and 52 bonded to the front or upstream side of the plates for sealingly engaging the seating surfaces 21 and 22 of the seat 16, as will presently be described. The portion 46 of resilient material of the flapper 34 is connected to the tubular portion 40 of the rib 32 by a web portion 54 and the resilient portion 48 of the flapper 36 is connected to the tubular portion 40 by a resilient web 56.

The resilient material of the tubular portion 40, the downstream portions 46 and 48, and the upstream sealing portions 50 and 52 are all integrally molded around the cylindrical rod 38 and the reinforcing plates 42 and 44 to produce the integral valve member 30. This can be accomplished by positioning the rigid, reinforcing members in a mold and simultaneously forming the various resilient parts while bonding the resilient material to the rigid members where desired. It will be appreciated by those skilled in the art that the resilient material can be bonded to the metallic members at selected points and not bonded to other points during the molding process merely by applying appropriate coatings to the metallic members prior to the molding process.

Figure 4:
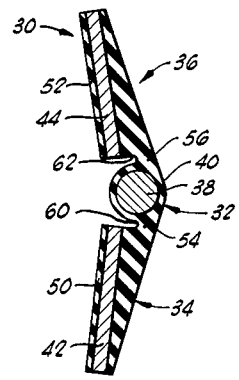
FIG. 4 is a sectional view taken substantially on lines 4—4 of FIG. 3.
Figure 12:
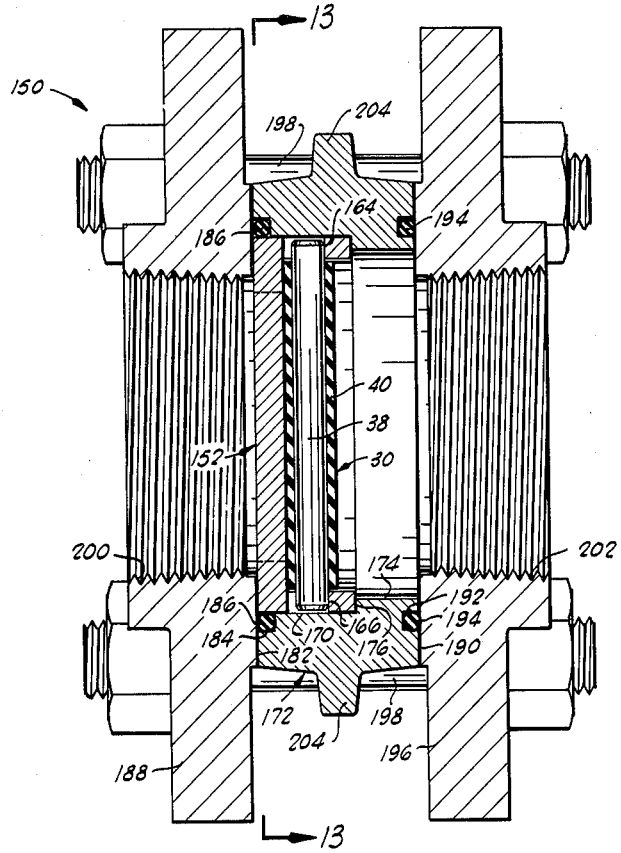
FIG. 12 is a longitudinal sectional view of another valve constructed in accordance with the present invention, the sectional view being taken substantially on lines 12—12 of FIG. 13.
Figure 13:
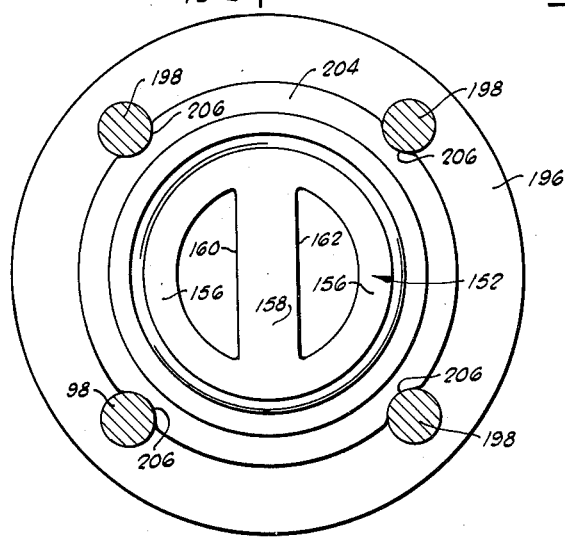
FIG. 13 is a sectional view taken substantially on lines 13—13 of FIG. 12.

The valve member 30 is preferably molded such that the front or upstream faces of the resilient portions 50 and 52 form an angle less than 180 degrees, or less than the angle between the seating surfaces 21 and 22, so that the resilient web portions 54 and 56 will have a natural relaxed position substantially as shown in FIG. 4, and will continually urge the flapper portions 34 and 36 onto the seat 16, as will presently be described.

Figure 2:
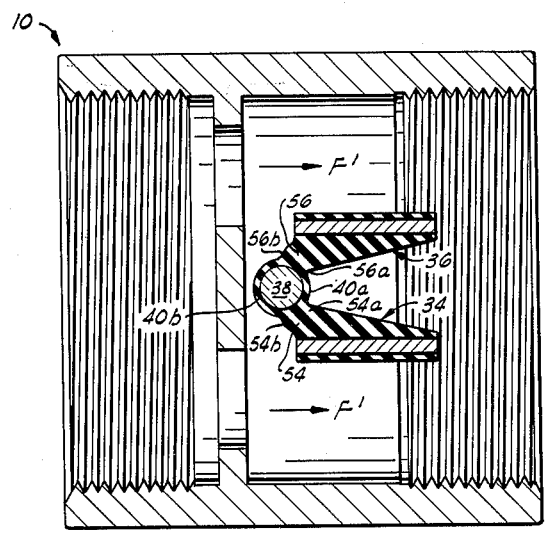
FIG. 2 is a longitudinal sectional view of the valve of FIG. 1 showing the valve in the full open position.

One important aspect of the present invention is the shape of the web portions 54 and 56 which can best be seen in the cross sectional configuration taken transverse to the rib portion 32 as shown in FIGS. 1, 2 and 4. First it will be noted that the web portion interconnects the flapper portion 34 and the downstream half of the tubular portion 40 such that the upstream face of the web portion is concavely curved which forms a rounded groove 60 in the upstream face extending the length of the web portion 54. The web portion 56 has a similar concave face which forms a groove 62 extending the length of the web portion 56. These grooves substantially reduce the tension in the web portion during maximum flexure without increasing the diameter of the valve or decreasing the area of the openings as would otherwise be required.

The valve 10 can be manufactured and assembled on a very economical basis. The housing 12 can be cast in its basic form and then machined to produce the seating surfaces 21 and 22 and the threaded couplings 14 and 15. The bore 28 can first be drilled by a standard drill press and the bit continued through the housing to drill the bore 26 to the desired depth. Then the bore 28 can be tapped and the Allen head plug 29 inserted to form a bottom to the bore 28 and make a fluid tight housing structure.

The valve member 30 is manufactured by first fabricating the rod 38 and the reinforcing plates 42 and 44, placing the reinforcing members in the mold, then molding the resilient material to form the completed structure. The valve member 30 can then be inserted in the housing 12 merely by moving the flapper portions 34 and 36 to the full open position illustrated in FIG. 2, inserting one end of the rod 38 in one of the bores 26 or 28, and then forcing the other end of the pin 38 along the inner wall of the housing 12 until it snaps into the other bore. For example, if the end 38a (see FIG. 5) is first inserted in the bore 26, the end 38b will slide along the inner wall 12a of the housing 12 until it snaps into the bore 28. The natural angle of the interior wall 12a relative to the bore 26 provides a mechanical advantage which makes it easy to distort the end 40a of the tubular portion 40 of the resilient material along the rod 38 to permit the end 38a of the rod to project into the bore 26 sufficient to allow the end 38b to enter the bore 28. When the end 38b snaps into the bore 28, the resiliency of the tubular portion 40, the length of which is substantially equal to the inside diameter of the housing, will automatically center the valve member 30 in the proper position for the flapper portions 34 and 36 to cover the apertures 22 and 24 and seat on the downstream face of the seat portion 16. The rod 38 may be retained in the bore in either of two ways. The bore 26 may be sufficiently deep for the rod to be first inserted as described above. In such a case, the tubular portion 40 of resilient material should be bonded to the rod 38 so that the ends 40a and 40b of the tubular portion will also properly center the rod 38 and insure that neither end becomes dislodged from its containing bore. Or the bore 26 can be made so shallow that the rod 38 cannot leave the bore 28 before contacting the bottom of the bore 26. In this case, the plug 29 can be loosened to increase the depth of the bore 28 until the rod can be snapped into the bore 26, then the plug tightened to retain the rod in both bores. In this case, the tubular portion need not be bonded to the rod to retain the rod in position. The rod 38 can still be removed by loosening the plug 29 and folding the flappers to the full open position. The tubular portion 40 will then grip the rod 38 sufficiently to remove it from the bottomed bore 26. It will be appreciated that in either case the tubular portion 40 will always maintain the flapper portions 34 and 36 properly centered so as to close the apertures 22 and 24 regardless of the position of the pin 38.

The operation of the valve 10 will readily be evident to those skilled in the art. Due to the bias molded into the resilient web portions 54 and 56 as previously described, the flapper portions 34 and 36 will tend to be maintained in contact with the downstream seating surface of the seat portion 16. However, when fluid flows through the housing 12 in the forward direction as indicated by the arrow F in FIG. 2, the flapper portions 34 and 36 will be moved to the position illustrated in FIG. 2 as the web portions 54 and 56 flex. Of course, the downstream faces 54a and 56a of the resilient material on the downstream side of the flapper portions and the tubular portion 40a between the web portions will be placed in compression. On the other hand, the upstream faces 54b and 56b along the grooves 60 and 62 of the web portions and the upstream portion 40b of the tubular portion 40 will be placed under tension. Due to the relatively large surface area of the grooves 60 and 62 and the portion 40b of the tubular portion, the tensile stress within the resilient material will be relatively slight and the fatigue limits of the resilient material will never be exceeded. If the tubular portion 40 is not bonded to the pin 38, the upstream portion 40b will stretch even more and will substantially reduce the tensile stress within the web portions 54 and 56. If the tubular portion 40 is bonded to the pin 38, the resilient material of the tubular portion will still reduce the tensile stress in the web portions, but not to such a marked degree as when the tubular portion is not bonded to the pin 38.

Upon cessation of flow through the housing 12 in the forward direction indicated by arrow F, the flapper portions 34 and 36 will be urged by the resiliency of the resilient material of the web portions 54 and 56 and the tubular portion 40 back to the seating surfaces 21 and 22. Then when a reverse pressure bias is applied to the valve, the resilient sealing portions 50 and 52 of the flapper portions 34 and 36 will provide an effective compression-type seal between the flapper members and the seat member.

A modified form of the valve member 30 is illustrated in FIGS. 7 and 8 and is indicated generally by the reference numeral 70. The valve member 70 is substantially identical to the valve member 30 except for the construction of the flapper portions and is used in a housing 12a which is identical to the housing 12 which has a seat portion 16a including an annular portion 18a and a transverse portion 20a to form the seating surfaces 21a and 22a around the apertures 23a and 24a. The valve member 70 has a rib portion 72 which is connected to flapper portions 74 and 76 by web portions 78 and 80, respectively. Reinforcing plates 82 and 84 are provided in the flapper portions 74 and 76, respectively. All structure described to this point is identical to the structure of the valve member 30. However, the valve member 70 is provided with circumferential sealing portions 86 and 88 which extend around the peripheral edges of the reinforcing plates 82 and 84, respectively, and project outwardly beyond the upstream face of the plates so as to engage the seating surfaces 21a and 22a of the seat member 16a prior to the plates 82 and 84.

Except for the sealing relationship of the flapper portions 74 and 76 with the seat member 16a, the operation of the valve member 70 is identical to the operation of the valve member 30. Thus when fluid flows through the apertures 22a and 24a from left to right when referring to FIG. 8, the web portions 78 and 80 will flex and the flapper portions 74 and 76 will swing downstream to positions corresponding to the positions of the flapper portions 34 and 36 in FIG. 2. As the flow subsides, the resiliency of the web portions 78 and 80 will return the flapper portions 74 and 76 to the positions illustrated in FIG. 7 with the sealing lips 86 and 88 in contact with the respective seating surfaces 21a and 22a of the seating member 16a. As a reverse pressure bias is applied to the flapper members 74 and 76 in the direction of the arrow P, the resilient sealing lips 86 and 88 will be deformed by the mechanical load to substantially the positions illustrated in FIG. 8. Of course, some compressive type sealing will be effected due to the resistance to distortion of the resilient material. However, a pressure responsive seal which is augmented by increases in the reverse pressure bias will also be established because any hairline leaks past the sealing lips 86 and 88 will result in a low pressure area and the high pressure acting upon the resilient material will instantaneously cause the resilient material to flow and close the minute opening. Thus as the pressure increases, the sealing effect will be augmented so that substantially any pressure can be effectively sealed until such time as the resilient material extrudes between the reinforcing plates 82 and 84 and the respective seating surfaces 21a and 22a, or the structure otherwise fails.

Referring now to FIGS. 9 and 10, another valve member constructed in accordance with the present invention is indicated generally by the reference numeral 100. The valve member 100 is substantially identical in construction to the valve member 30 except that the resilient portions 50 and 52 used to effect the compressive-type seal are replaced by another compressive-type sealing means which will presently be described. Thus the valve member 100 is comprised of a rib portion 102, which is connected to flapper portions 104 and 106 by web portions 108 and 110, respectively. The flapper portions 104 and 106 have reinforcing plates 112 and 114, respectively. The valve member 100 can be used in the housing 12 in the same manner as the valve member 30. A sealing bead of resilient material 116 extends around the periphery of and is bonded to the upstream face of the plate 112 and a similar sealing bead 118 extends around the periphery of and is bonded to the upstream face of the plate 114. As can best be seen in FIG. 10, the sealing bead 116 has a semicircular cross section in order to provide a high pressure loading per unit area of contact with the respective seating surfaces for any given reverse pressure bias acting on the opposite side of the respective flapper portion.

The operation of the valve member 100 is substantially identical to the operation of the valve member 30. However, when a reverse pressure bias is applied to the flapper portions 104 and 106, the entire pressure load applied to the backs of the respective flapper portions will be transmitted to the relatively small area of the respective sealing bead which is in contact with the sealing surface of the seat member. Thus the pressure per unit area applied to the resilient seating bead will be considerably greater than the fluid pressure per unit area and the resilient material of the sealing bead will effectively resist distortion and displacement by the fluid and will enter any irregularities on the surface of the seat member to prevent fluid leakage.

Referring now to FIG. 11, another valve member constructed in accordance with the present invention is indicated generally by the reference numeral 90. The valve member 90 is identical in most respects to the valve member 70 and like parts will be designated by the corresponding numbers modified by the subscript a. However, the valve member 90 is provided with a sheet of pliable material 92 which is imbedded within the resilient material of the valve member substantially as illustrated in the drawing in order to increase the tensile strength of the web portions 78a and 80a. It will be noted that the pliable material is bonded between the reinforcing plates 82a and 84a and the resilient material on the backs of the flapper portions 74a and 76a. The pliable material then passes generally along the center line (line of zero stress under flexure) of the web portions 78a and 80a and around the upstream side of the rod 94 within the rib portion 72a. The pliable material 92 may be substantially coextensive with the valve member 90 or may be one or more strips disposed at spaced points along the rib portion 92.

When the flapper portions 74a and 76a are moved to the open position corresponding substantially to the position of the valve member 30 in FIG. 2, it will be evident that the sheet of pliable material will materially increase the tensile strength of the web portions 78a and 80a without affecting its resiliency. Therefore the flapper portions can be made of considerable size and weight and yet still be supported in the desired position, and can also be used under relatively high flow velocity conditions without danger of the web portions failing.

Another valve constructed in accordane with the present invention is indicated generally by the reference numeral 150 and is illustrated in FIGS. 12–15. The valve 150 utilizes any one of the valve members 30, 70, 90 or 100, heretofore described, but for convenience the valve 150 will be illustrated as using the valve member 30 and all parts will be designated with the corresponding numbers.

The valve member 30 is retained in and cooperatively engages a seat member indicated generally by the reference numeral 152 and shown in perspective view in FIG. 15. The seat member 152 is formed within a generally cylindrical sleeve 154 which has an annular shoulder portion 156 and a transverse portion 158 which forms a seating surface lying substantially in a plane and having a pair of apertures 160 and 162 extending therethrough. A pair of bores 164 and 166 pass through opposite walls of the cylindrical sleeve portion 154 and are aligned with the transverse portion 158. The pin 38 of the valve member 30 extends into the bores 164 and 166 for retaining the valve member 30 in place.

The seat member 152 is received in a cylindrical counterbore 170 of a generally tubular housing 172 which has a bore 174 extending therethrough. The difference in the diameters of the bore 174 and the counterbore 170 forms a peripheral shoulder 176 which faces upstream, and the downstream end 178 of the seat member 152 abuts the shoulder. The length of the seat member 152 in the longitudinal dimension is preferably precisely equal to the depth of the counterbore 170 such that when the end 178 abuts the shoulder 176, the upstream face 180 will be flush with the upstream face 182 of the housing 172. A second counterbore 184 to the counterbore 170 in conjunction with the outer perimeter of the seat member 152 forms an annular groove for receiving an O-ring seal 186 which provides a fluid seal between the seat member 152 and the housing 172 and also between the housing 172 and a bolted flange coupling 188, as will presently be described.

The downstream end 190 of the housing 172 is also provided with an annular groove 192 for receiving an O-ring seal 194 which provides a fluid seal between the downstream end 190 and a second bolted flange coupling 196. It will be noted that the upstream and downstream faces 182 and 190 are both planar and preferably parallel so that the housing 172 can be bolted between the two standard flange couplings 188 and 196 by stud bolts 198. Of course, the flange couplings 188 and 196 may be provided with internal threads 200 and 202 for connecting the flanges to a standard fluid conduit, or any other suitable coupling means may be provided for connecting the flange onto the conduit. A projection 204 may be provided around the circumference of the housing 172 to both reinforce the housing 172 against internal pressure and to also serve as a means for spacing the housing between the bolts 198. In this connection, the annular ridge 204 is preferably provided with recesses 206 for receiving the bolts 198, as can best be seen in FIG. 13.

The operation of the valve 150 is substantially identical to the operation of the valve 10. When fluid flows through the valve from left to right, when referring to FIG. 12, the flapper portions 34 and 36 will be pivotally moved away from the seat member 152 as the web portions flex and will assume substantially the positions illustrated in FIG. 2. As the flow ceases, the flapper portions will be returned to the seat portion 152 by the resiliency of the web portions. The O-ring 186 seals the annular space between the cylindrical sleeve portion 154 of the seat member 152 and the counterbore 170 and also seals the space between the flange 188 and the upstream end of the seat member 152. The O-ring 194 seals the annular space between the housing 172 and the flange 186, including any fluid which may pass through the bores 164 and 166. The force exerted on the valve member 30 by a reverse pressure bias will be transmitted to the seat member 152 and then to the flange 188 and by the bolts 198 to the flange 196 such that the force will be resisted by one or both of the conduits to which the flange couplings are connected.

An important aspect of the valve 150 is the ease with which the valve can be manufactured and assembled, and the ease with which the valve can be disconnected from a conduit and repaired. It will readily be evident that the single piece housing 172 can be molded and machined by standard manufacturing processes. Similarly, the seat member 152 can be molded to form the apertures 160 and 162 and then machined to provide the desired finishes. Next the bores 164 and 166 can be drilled by a single pass of a drill bit. The valve member 30, or any of the other valve member embodiments described, may be easily manufactured as a single, integral unit, as previously described. Of course, the O-ring seals 186 and 194, the coupling flanges 188 and 196, and the bolts 198 are all standard items which can be purchased on the open market.

The valve can be assembled merely by moving the flapper portions 34 and 36 substantially to the position illustrated in FIG. 2, inserting one end of the rod 38 in one of the bores, and distorting the end of the tubular portion 40 of the resilient material to insert the other end of the rod in the other bore. The tubular portion will center the flapper portions as previously described and if bonded to the rod will also center the rod in the bores. However, the tubular body 40 of resilient material is preferably not bonded to the pin 38 and in this case the pin 38 may be very easily slipped first into one bore, then into the other, and then centered by access through either of the bores 164 and 166. In this connection, several desirable aspects of the construction should be noted. The bores 164 and 166 are somewhat larger in diameter than the pin 38 so that the pin can be inserted at an angle in one of the bores until it is inserted in the other. Also, the pin 38 is preferably almost as long as the outside diameter of the seat portion 152 so as to insure that the pin 38 cannot leave either of the bores after the seat member 152 is inserted in the housing 172. This feature is almost essential when the pin 38 is not bonded to the resilient material. In either event, it will be appreciated that the tubular portion 40 should be substantially the same length as the internal diameter of the tubular sleeve portion of the seat member 152 so that the valve member 30 will always be properly centered within the seat member 152.

After the valve member 30 has been inserted in the seat member 152, the seat member 152 is merely inserted in the counterbore 170, the O-ring seals 186 and 194 inserted in the respective grooves, the assembled housing and seat members position between the flange couplings 188 and 196 and the bolts 198 tightened to complete the structure. It will readily be appreciated that by removing two of the bolts 198, the housing 172 can be removed from between the coupling flanges 188 and 196 without disconnecting the flanges from the fluid conduit. Both the seat member 152 and valve member 30 can then be quickly and easily replaced without any tools, or the valve member 30 can be replaced merely by pressing downwardly on one end of the pin 38 through one of the bores. Thus it will be appreciated that the valve 150 can be replaced or repaired in the field with the aid of only a pair of hand tools to loosen the bolts 198.

From the above detailed description of the several embodiments of the present invention, it will be evident that a very simple valving device has been described which can be economically manufactured on a mass production basis. But even more importantly, by reason of its novel construction, the various valve members will have a very long and trouble free service life due to the greatly reduced tension in the resilient web portions interconnecting the rib portions and the flapper portions. Further, the resiliency of the material provides a very simple means for returning the flapper portions to the valve seat when flow ceases to promote reliable operation. Due to the novel construction of the valve, the flapper portions may be fabricated in such a manner as to continually seat the flapper portions on the valve with sufficient force to seal and check very low pressures. Further, due to the reinforcing members of the valve member, very high fluid pressures can be checked. Yet no precision mating between the substantially rigid parts is necessary to hold any but the very highest pressure. The resilient sealing material on the metallic reinforcing plates together with the spring bias effect of the web portions insures a very quite and chatter free operation. A novel fluid responsive sealing lip has also been disclosed which is augmented by increases in the reverse pressure being checked. Also, a housing structure has been described for utilizing the novel valve members which can be inserted between a pair of coupling flanges and which can be very economically manufactured and assembled, and which can be easily repaired using only hand tools without disconnecting the flange couplings from a fluid conduit.

Although several preferred embodiments and variations thereof have been described in detail, it is to be understood that various changes, substitutions and alterations can be made therein without departing from the spirit and scope of the invention as defined by the appended claims.

What is claimed is:
1. An improved flapper-type check valve comprising:
   a generally tubular housing having upstream and downstream ends;
   a generally planar seat member formed in the housing, the seat member comprising an annular portion extending circumferentially around the housing and a transverse portion extending transversely across the housing between opposite sides of the annular portion to form a pair of apertures each surrounded by a seating surface which faces downstream;
   a valve member comprising a substantially rigid rod portion connected at each end to the housing and disposed downstream of and aligned with the transverse portion of the seat member, a pair of flapper portions for seating on the respective seating surfaces and closing the respective apertures, and a resilient hinge portion interconnecting the rod portion and each of the flapper portions, the hinge portion having a tubular portion substantially equal in length to the inside diameter of the tubular housing disposed around the rod portion and web portions extending longitudinally of and substantially equal in length to the tubular portion and interconnecting the tubular portion and the respective flapper portions,
   whereby the flapper portions will be pivotally displaced from the seating surfaces responsive to forward fluid flow and will return to the seating surfaces upon application of a reverse pressure bias to block reverse flow.
2. An improved flapper-type check valve comprising:
   a generally tubular housing having upstream and downstream ends;
   a generally planar seat member formed in the housing, the seat member comprising an annular portion extending circumferentially around the housing and a transverse portion extending transversely across the housing between opposite sides of the annular portion to form a pair of apertures each surrounded by a seating surface which faces downstream;
   a valve member comprising a substantially rigid rod portion connected at each end to the housing and disposed downstream of and aligned with the transverse portion of the seat member, a pair of substantially rigid reinforcing members sized to engage the respective seating surfaces and cover the respective apertures therein, and a mass of resilient material interconnecting the rod portion and the reinforcing members comprising a tubular portion disposed around the rod portion, flapper portions bonded to the reinforcing members, and web portions interconnecting the tubular portion and the respective flapper portions, the web portions extending longitudinally of the tubular portion,
   whereby the flapper portions will be pivotally displaced from the seating surfaces responsive to forward fluid flow and will return to the seating surfaces responsive to a reverse pressure bias to block reverse flow.
3. An improved flapper-type check valve as defined in claim 2 wherein the valve member is further characterized in that:
   the web portions are connected to the downstream half of the tubular portion and to the downstream half of the respective flapper portions,
   whereby the cross-section of the web portions will be generally U-shaped and facing upstream and the web portions will be subjected to lower stress upon flexure and will have a long service life.
4. An improved flapper-type check valve as defined in claim 2 wherein the valve member is further characterized in that:
   the flapper portions of the resilient material extend around the peripheral edges of the respective reinforcing members and project beyond the upstream face of the respective reinforcing members to form a peripheral, pressure reponsive sealing lip which engages the respective seating surface before the respective reinforcing member as the valve is subjected to a reverse pressure bias.
5. An improved flapper-type check valve as defined in claim 2 wherein the valve member is further characterized by:
   a resilient sealing ring bonded to the upstream face of the respective reinforcing members for engaging the respective seating surface around the respective apertures and forming a compressive type seal between the seating surface and the reinforcing member when the valve is subjected to a reverse pressure bias.
6. An improved flapper-type check valve as defined in claim 2 wherein:
   the flapper portions are disposed at an angle less than the angle formed between the seating surfaces around the apertures when the resilient material is relaxed,
   whereby the resilient material will urge the flapper portions against the seating surfaces under no flow conditions.
7. An improved flapper-type check valve comprising:
   a generally tubular housing having upstream and downstream ends, the tubular housing comprising a generally cylindrical body having a cylindrical bore extending therethrough and a counterbore forming an annular shoulder therein, an insert seat member comprising a generally tubular portion disposed in the counterbore and abutting the annular shoulder and an annular portion extending circumferentially around the tubular portion and a transverse portion extending transversely across the tubular portion between opposite sides of the annular portion to form a pair of apertures each surrounded by a seating surface which faces downstream, and a pair of transversely aligned bores extending through the walls of the tubular portion, the bores being disposed downstream of and aligned with the transverse portion, annular sealing means disposed between the seat member and the cylindrical body and located upstream from the bores;
   a valve member disposed in the housing, the valve member comprising a substantially rigid rod por- tion, the ends of the rod portion being disposed in the bores of the seat member, a pair of flapper portions for seating on the respective seating surfaces and closing the respective apertures, and a resilient hinge portion interconnecting the rod portion and each of the flapper portions, the hinge portion having a sleeve portion disposed around the rod portion and web portions extending longitudinally of the rod portion and interconnecting the sleeve portion and the respective flapper portions, said sleeve and web portions being substantially equal in length to the inside diameter of the tubular portion of the insert seat member, whereby the flapper portions will be pivotally displaced from the seating surfaces responsive to forward fluid flow and will return to the seating surfaces upon application of a reverse pressure bias to block reverse fluid flow.

8. An improved flapper type check valve comprising:

a generally tubular housing having upstream and downstream ends, said housing having oppositely disposed bores in the internal walls thereof, a generally planar seat member formed in the housing, the seat member comprising an annular portion extending circumferentially around the housing and a transverse portion extending transversely across the housing between opposite sides of the annular portion to form a pair of apertures each surrounded by a seating surface which faces downstream; and, a valve member comprising a substantially rigid rod portion having each end disposed in the oppositely disposed bores in the housing and disposed downstream of and aligned with the transverse portion of the seat member, a pair of flapper portions for seating on the respective seating surfaces and closing the respective apertures, and a resilient hinge portion interconnecting the rod portion and each of the flapper portions, the hinge portion having a tubular portion substantially equal in length to the inside diameter of the housing disposed around and bonded to the rod portion for maintaining the valve members properly oriented with respect to the seating surfaces and for retaining the ends of the rod portions in the bores, and web portions extending longitudinally of the rod portion and interconnecting the tubular portion and the respective flapper portions, whereby the flapper portions will be pivotally displaced from the seating surfaces responsive to forward fluid flow and will return to the seating surfaces upon application of a reverse pressure bias to block reverse flow.

9. An improved flapper type check valve comprising:

a generally tubular housing having upstream and downstream ends, the tubular housing comprising a generally cylindrical body having a cylindrical bore extending therethrough and a counterbore at the upstream end of the housing forming an annular shoulder therein, an insert seat member comprising a generally tubular portion disposed in and substantially equal in length to the counterbore and abutting the annular shoulder and an annular portion extending circumferentially around the tubular portion, said insert seat member also having a transverse portion extending transversely across the tubular portion between opposite sides of the annular portion to form a pair of apertures each surrounded by a seating surface which faces downstream, and a pair of transversely aligned bores extending through the walls of the tubular portion, the bores being disposed downstream of and aligned with the transverse portion;

a flange disposed at each end of the cylindrical body for holding the seat member in the body and for connection to a fluid conduit;

fastener means interconnecting the flanges to hold the cylindrical body in position;

annular sealing means disposed between the seat member and the body at the junction between the seat member, the body, and the flange providing an annular fluid seal between the flange, seat member, and the body;

annular sealing means between the other flange and the downstream end of the body; and a valve member disposed in the housing, the valve member comprising a substantially rigid rod portion, the ends of the rod portion being disposed in the bores of the seat member, a pair of flapper portions for seating on the respective seating surfaces and closing the respective apertures, and a resilient hinge portion interconnecting the rod portion and each of the flapper portions, the hinge portion having a sleeve portion disposed around the rod portion and web portions extending longitudinally of the rod portion and interconnecting the sleeve portion and respective flapper portions, whereby the flapper portions will be pivotally displaced from the seating surfaces responsive to forward fluid flow and will return to the seating surfaces upon application of a reverse pressure bias to block reverse fluid flow.

References Cited by the Examiner

UNITED STATES PATENTS

| 3,007,488 | 11/61 | Wheeler | 137—515.7 |
| 3,058,487 | 10/62 | Helling | 137—525 XR |
| 3,081,791 | 3/63 | Wheatley | 137—454.2 |
| 3,128,785 | 4/64 | Krummel | 137—525.3 XR |

FOREIGN PATENTS

| 814,287 | 6/59 | Great Britain. |

M. CARY NELSON, *Primary Examiner.*